(12) United States Patent
Ohshima

(10) Patent No.: US 6,590,888 B1
(45) Date of Patent: Jul. 8, 2003

(54) CELLAR SYSTEM, MOBILE PORTABLE APPARATUS, BASE STATION APPARATUS, OPTIMUM PATH DETECTING METHOD, AND APPARATUS THEREOF

(75) Inventor: Manabu Ohshima, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/260,049

(22) Filed: Mar. 2, 1999

(30) Foreign Application Priority Data

Mar. 4, 1998 (JP) .......................................... 10-052414

(51) Int. Cl.[7] .............................................. H04B 7/216
(52) U.S. Cl. ....................... 370/342; 375/142; 375/150; 370/335
(58) Field of Search ................................ 370/342, 335, 370/441; 375/142, 144, 147–148, 150

(56) References Cited

U.S. PATENT DOCUMENTS

| 6,072,807 | A | * | 6/2000 | Daudelin | 370/465 |
| 6,075,809 | A | * | 6/2000 | Naruse | 375/147 |
| 6,078,611 | A | * | 6/2000 | La Rosa et al. | 375/206 |
| 6,108,370 | A | * | 8/2000 | Naruse | 375/150 |
| 6,266,365 | B1 | * | 7/2001 | Wang et al. | 375/150 |
| 6,269,075 | B1 | * | 7/2001 | Tran | 370/206 |

FOREIGN PATENT DOCUMENTS

| JP | 7-193525 | 7/1995 |
| JP | 8-340316 | 12/1996 |
| JP | 9-181704 | 7/1997 |
| JP | 9-261128 | 10/1997 |

* cited by examiner

*Primary Examiner*—Kwang Bin Yao
*Assistant Examiner*—Thai D Hoang
(74) *Attorney, Agent, or Firm*—Sughrue Mion, PLLC

(57) ABSTRACT

A cellar system using code divisional multiple access (CDMA) system is disclosed, that comprises a plurality of finger circuits, and a search engine portion having a reception level measuring portion for detecting reception levels from reception signals and comparing the reception levels with a predetermined threshold value, a plurality of inversely spreading portions for multiplying the reception signals by spread codes, an inner memory for storing correlation signals received from the plurality of inversely spreading portions, and a reception path timing generating portion for detecting reception paths from output signals of the inner memory and, generating a path timing, wherein the search engine portion determines whether or not to output a correlation signal of the inner memory to the reception path timing generating portion.

14 Claims, 7 Drawing Sheets

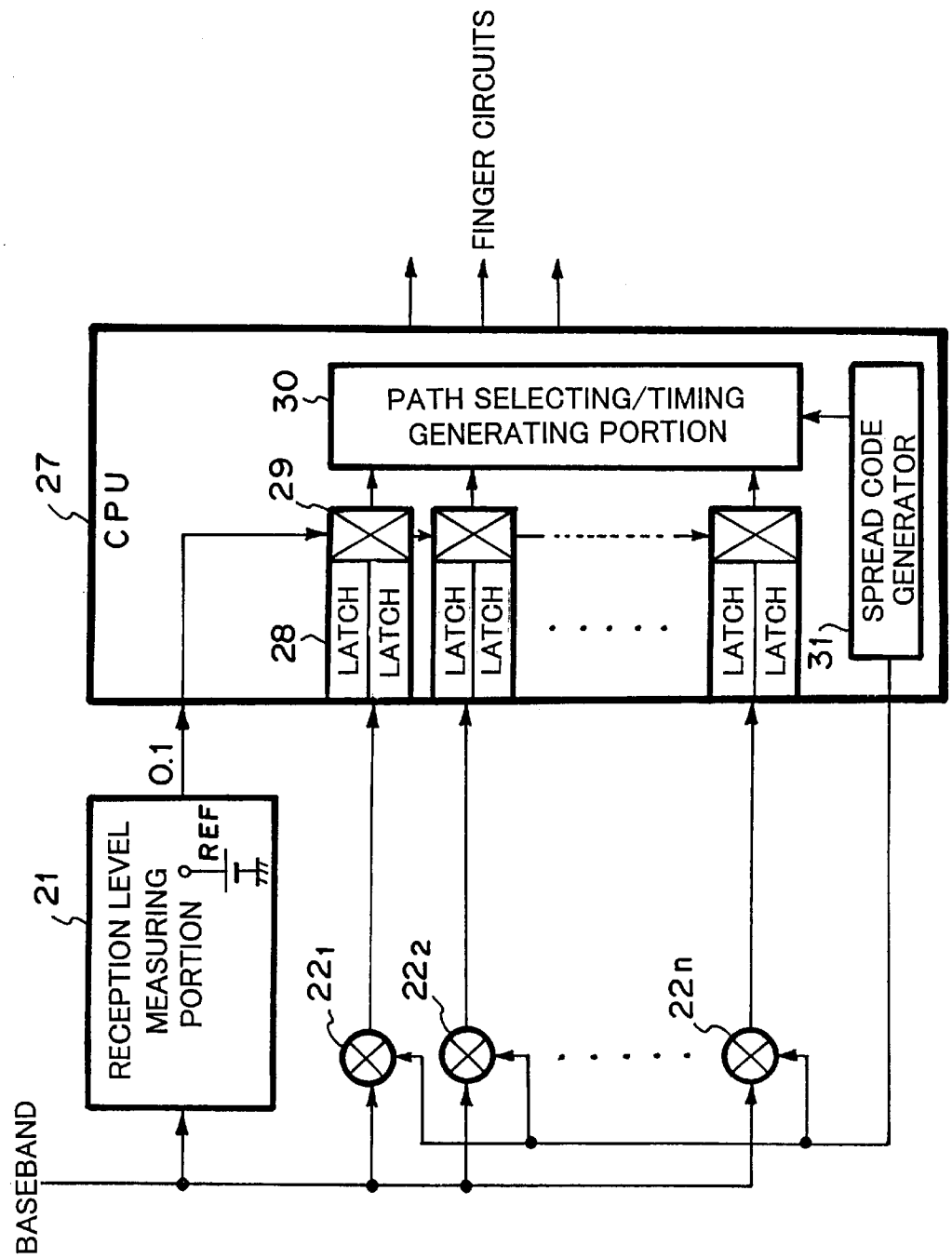

CELLAR SYSTEM, MOBILE PORTABLE APPARATUS, BASE STATION APPARATUS, OPTIMUM PATH DETECTING METHOD, AND APPARATUS THEREOF

BACKGROUND OF THE INVENTION

1. Field of the Invention

The present invention relates to a CDMA (Code Division Multiple Access) cellar system, in particular, a CDMA cellar system, an optimum path detecting method, an apparatus thereof, a mobile portable apparatus, and a base station apparatus that allow a path timing to be obtained corresponding to the maximum reception level of reception data.

2. Description of the Related Art

In a digital mobile telephone system and a portable telephone system (cellar system) that use the CDMA system, RAKE/diversity receiving technologies and transmission power controlling technologies have been widely used as a CDMA cellar system in multi-path fading environments because of high secrecy, interference resistance, high communication capacity, and high quality communication.

Amount them, a reception path timing searching technology is important. The searching accuracy of the reception path timing largely affects characteristics of the RAKE/diversity receiving process of the CDMA cellar system.

As a first related art reference, a spread spectrum receiving apparatus disclosed in Japanese Patent Laid-Open Publication No. 8-340316 will be described. FIG. 1 is a block diagram showing principal portions of a spread spectrum receiving apparatus. In FIG. 1, a received spread spectrum signal is supplied to a frequency converting circuit 121. The frequency converting circuit 121 converts the spread spectrum signal into a low frequency signal. The low frequency signal is supplied to a first multiplying unit 122 of a first inversely spreading circuit. The first multiplying unit 122 multiplies the low frequency signal by a spread code P2 generated by a shift register 132 (that will be described later). An output signal of the first multiplying unit 122 is supplied to a phase comparing circuit 124.

The phase comparing circuit 124 compares the phase of the output signal of the first multiplying unit 122 with the phase of an output signal of a VCO 130 that varies the frequency of a generated signal. An output signal of the phase comparing circuit 124 is supplied to a low pass filter LPF 126. The low pass filter LPF 126 smooths the output signal of the phase comparing circuit 124. An output signal of the low pass filter LPF 126 is supplied as a control signal to the VCO 130. The first multiplying unit 122, the phase comparing circuit 124, the LPF 126, the VCO 130, a frequency dividing circuit 127, a spread code generating circuit 123, and the shift register 132 compose a phase synchronizing circuit (namely, a phase locked loop: PLL). The PLL operates so that the phase difference between two input signals of the phase comparing circuit 124 becomes zero.

The output signal of the VCO 130 is also supplied to the frequency dividing circuit 127 in addition to the phase comparing circuit 124. The frequency dividing circuit 127 divides the frequency of the output signal of the VCO 130. The spread code generating circuit 123 generates a spread code P0 corresponding to an output signal of the frequency dividing circuit 127. In addition, the shift register 132 generates a plurality of spread codes P1 to P4 with difference phases corresponding to the spread code P0. The shift register 132 is composed of for example four staged registers. The spread code P0 received from the spread code generating circuit 123 is successively transferred from the first staged register to the fourth staged register corresponding to a clock signal that is the output signal of the VCO 130. An output signal of the first staged register is the spread code P4. Output signals of the second to fourth staged registers are the spread codes P3, P2, and P1, respectively. The spread codes P1, P2, P3, and P4 delay from the spread code P0 by four clock pulses, three clock pulses, two clock pulses, and one clock pulse of the output signal of VCO 130, respectively.

The spread code generating circuit 123 is composed of for example a shift register and an exclusive OR gate. The spread code generating circuit 123 is a well-known circuit that generates an M code sequence corresponding to the clock signal that is the output signal of the VCO 130. The spread codes P1, P2, P3, and P4 synchronize with the output signal of the VCO 130. The spread codes P1, P2, P3, and P4 are supplied to second inversely spreading circuits 133, 134, 135, and 136, respectively. The second inversely spreading circuits 133 to 136 inversely spread the spread spectrum codes.

Output signals of the second inversely spreading circuits 133 to 136 are supplied to a level detecting circuit 137. The level detecting circuit 137 detects levels of the output signals of the second inversely spreading circuits 133 to 136 by envelop detecting method and extracts correlations between the spread spectrum signals and spread codes. Output signals of the level detecting circuit 137 are supplied to a determining circuit 138. The determining circuit 138 determines a signal with the highest level of the output signals of the second inversely spreading circuits 133 to 136. An output signal of the determining circuit 138 is supplied to a switching circuit 139. The switching circuit 139 selects a signal with the highest level from the output signals of the second inversely spreading circuits 133 to 136 corresponding to the determined result of the determining circuit 138.

An output signal of the switching circuit 139 is supplied to a BPF 128. The BPF 128 limits the frequency band of the output signal of the switching circuit 139. An output signal of the BPF 128 is supplied to a demodulating circuit 129. The demodulating circuit 129 demodulates the output signal of the BPF 128. The plurality of second inversely spreading circuits detect a level with the highest correlation. Thus, the synchronization of spread spectrum codes can be securely acquired and tracked.

Next, a second related art reference disclosed in Japanese Patent Laid-Open Publication No. 7-193525 will be described. The second related art reference relates to a synchronizing method for a radio communication network, in particular, to a synchronizing method for a radio communication network of which each repeating station repeats a synchronous signal at a transmission timing fixedly assigned with an ultra-frame using frequency hopping type spread spectrum modulation (FH-CDMA) and a time division multiple access (TDMA). In the second related art reference, the reception levels of synchronous signals received from individual repeating stations are successively compared for individual ultra-frames. The transmission timing with the maximum reception level is stored. In the next ultra-frame, an operation corresponding to the synchronous signal at the transmission timing stored in the preceding ultra-frame is repeated for individual ultra-frames. Thus, an adjacent station with the highest reception level can be tracked. Consequently, a signal can be synchronously and stably received.

Next, a third related art reference disclosed in Japanese Patent Laid-Open Publication No. 9-261128 will be described. The third related art reference relates to a synchronizing apparatus disposed in a spread spectrum communication receiver for use with a digital mobile radio communication system. The synchronizing apparatus comprises a DLL for synchronously tracking a PN (Pseudo-Noise) signal against sampling data received from an A/D converter that converts a reception signal into a digital signal, a searching unit for searching a path from which a reception signal with the maximum power is obtained, and a data demodulating correlator for inversely spreading and demodulating the reception signal.

The searching unit has a searching PN generator for generating a PN phase of the PN signal, a searching correlator for correlating sampling data with the PN signal and outputting correlation value data, a data buffer for storing the correlation value data, a path searching unit for searching correlation value data of a path with the maximum power from the data buffer and outputting the PN path of the searched correlation value data, a means for outputting the PN phase of the PN signal received from the path searching unit to the DLL and the data demodulating correlator, and a PN signal switching means for switching the PN phase of the PN signal that is output from the PN signal outputting means to the phase of the path with the maximum power wherein the PN phase of the PN signal that is output to the DLL is the same as the phase of the data demodulating PN signal so that the phase of the path with the maximum power is always maintained.

In such a structure, with a means for switching the phase of the PN signal that is output to the DLL to the phase of a path with the maximum power in such a manner that the phase of the PN signal that is output to the DLL matches with or is independent from the phase of the PN signal to be demodulated in the case the level of a path tracked by the DLL (Delay Locked Loop) decreases due to fading and the synchronization of the DLL is lost, before the synchronization of the DLL is lost, the phase of the PN signal that is output to the DLL is switched to the phase of another path with the highest power.

As conventional reception path timing searching methods, in the first related art reference, the output signal of the second inversely spreading circuit is selected corresponding to an output signal with the highest correlation value. In the second related art reference, a signal with the highest reception level transmitted from an adjacent station is always tracked. In the third related art reference, the phase of a PN signal is always switched to the phase of a path with the maximum power. According to the third related art reference, the DLL obtains a correlation of a predetermined number of chips in a predetermined delay time period is obtained. Next, the delay time period is repeatedly varied by a predetermined value (for example, ½ chip). A point with the largest correlation is treated as a reception timing position at which a signal is received. This method is referred to as sliding correlation calculation searching method.

However, in SSA (Serial Search Acquisition) method as the sliding correlation calculation searching method, even if the reception level of a signal fluctuates due to a multi-path fading environment and deteriorates, a reception path timing is searched corresponding to the reception signal at the point. Thus, since the reception path is incorrectly detected, the reception accuracy deteriorates.

When the reception state deteriorates in the multi-path environment and an reception error takes place, although reception data and reception level (RSSI: Receive Signal Strength Indicator) fluctuate, the reception data is demodulated corresponding to an established acquisition condition. Thus, the reliability of the established reception tracking technology may be lost. Consequently, data cannot be received at a low error rate.

SUMMARY OF THE INVENTION

The present invention is made from the above-described point of view. An object of the present invention is to provide a cellar system, a mobile portable apparatus, a base station apparatus and an optimum path detecting method which a reception path timing is searched with reception data in a large reception level and reception data is correlated and combined corresponding to the reception paths. Further, an another object of the present invention is to provide the apparatus which an incorrect detection of a reception path due to the fluctuation of a reception level can be suppressed. Furthermore, an another object of the present invention is to provide the apparatus which in a multi-path fading environment, a reception signal can be stably and accurately obtained.

A first aspect of the present invention is a cellar system using code divisional multiple access (CDMA) system, comprising a plurality of finger circuits, and a search engine portion having a reception level measuring portion for detecting reception levels from reception signals and comparing the reception levels with a predetermined threshold value, a plurality of inversely spreading portions for multiplying the reception signals by spread codes, an inner memory for storing correlation signals received from the plurality of inversely spreading portions, and a reception path timing generating portion for detecting reception paths from output signals of the inner memory and generating a path timing, wherein the search engine portion determines whether or not to output a correlation signal of the inner memory to the reception path timing generating portion.

The reception levels of the reception signals are measured for each frame. When the reception levels of the reception signals in the current frame are lower than the predetermined threshold value, a correlation signal in the preceding frame is output from the inner memory.

The plurality of finger circuits inversely spread the reception signals corresponding to the reception paths detected by the search engine portion and synchronously adds correlation output signals of the plurality of finger circuits.

A second aspect of the present invention is a mobile portable apparatus using code divisional multiple access (CDMA) system, comprising a demodulating portion for demodulating reception signals to base-band signals, and a search engine portion for selecting reception paths corresponding to multi-paths, the searching engine portion having a reception level measuring portion for detecting reception levels from reception signals and comparing the reception levels with a predetermined threshold value, a plurality of inversely spreading portions for multiplying the reception signals by spread codes, an inner memory for storing correlation signals received from the plurality of inversely spreading portions, and a reception path timing generating portion for detecting reception paths from output signals of the inner memory and generating a path timing, wherein the search engine portion determines whether or not to output a correlation signal of the inner memory to the reception path timing generating portion.

A third aspect of the present invention is a base station apparatus of a cellar system using code divisional multiple access (CDMA) system, comprising an antenna for transmitting and receiving a signal to/from a mobile portable apparatus, a radio portion for transmitting and receiving a signal to/from the antenna, and a baseband portion for transmitting and receiving a signal to/from the radio portion, wherein the baseband portion has a spreading portion for spreading a transmission digital signal, a RAKE receiving portion for receiving signals corresponding to multi-paths, and a search engine portion for detecting reception paths, wherein the search engine portion has a reception level measuring portion for detecting reception levels from reception signals and comparing the reception levels with a predetermined threshold value, a plurality of inversely spreading portions for multiplying the reception signals by spread codes, an inner memory for storing correlation signals received from the plurality of inversely spreading portions, and a reception path timing generating portion for detecting reception paths from output signals of the inner memory and generating a path timing, wherein the search engine portion determines whether or not to output a correlation signal of the inner memory to the reception path timing generating portion.

A fourth aspect of the present invention is an optimum path detecting method used for code divisional multiple access (CDMA) system for demodulating reception signals to baseband signals and causing a search engine portion to select reception paths corresponding to multi-paths from the baseband signals, comprising the steps of detecting reception levels of the baseband signals, comparing the reception levels with a predetermined threshold value, multiplying the baseband signals by a spread code so as to inversely spread the reception signals, storing correlation signals corresponding to the inversely spread results to an inner memory, detecting a reception path from an output signal of the inner memory, generating a path timing corresponding to the reception path, and selectively outputting the correlation signal from the inner memory corresponding to the compared results.

A fifth aspect of the present invention is an optimum path detecting method used for code divisional multiple access (CDMA) system, comprising the steps calculating correlation values of reception signals at predetermined intervals, comparing the correlation values with a predetermined threshold value, determining whether to select a reception path corresponding to a peak position of the correlation value of the current reception signal or the just preceding reception signal corresponding to the compared results.

A sixth aspect of the present invention is an optimum path detecting apparatus used for code divisional multiple access (CDMA) system, comprising a means for detecting correlations of reception signals at predetermined intervals, a means for detecting the levels of the reception signals, a means for detecting a reception path corresponding to a peak position of a correlation value of the current reception signal or the just preceding reception signal corresponding to the detected levels.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 7 is a block diagram showing the structure of a receiving portion according to an embodiment of the present invention.

DESCRIPTION OF PREFERRED EMBODIMENTS

First Embodiment

Figure 1:
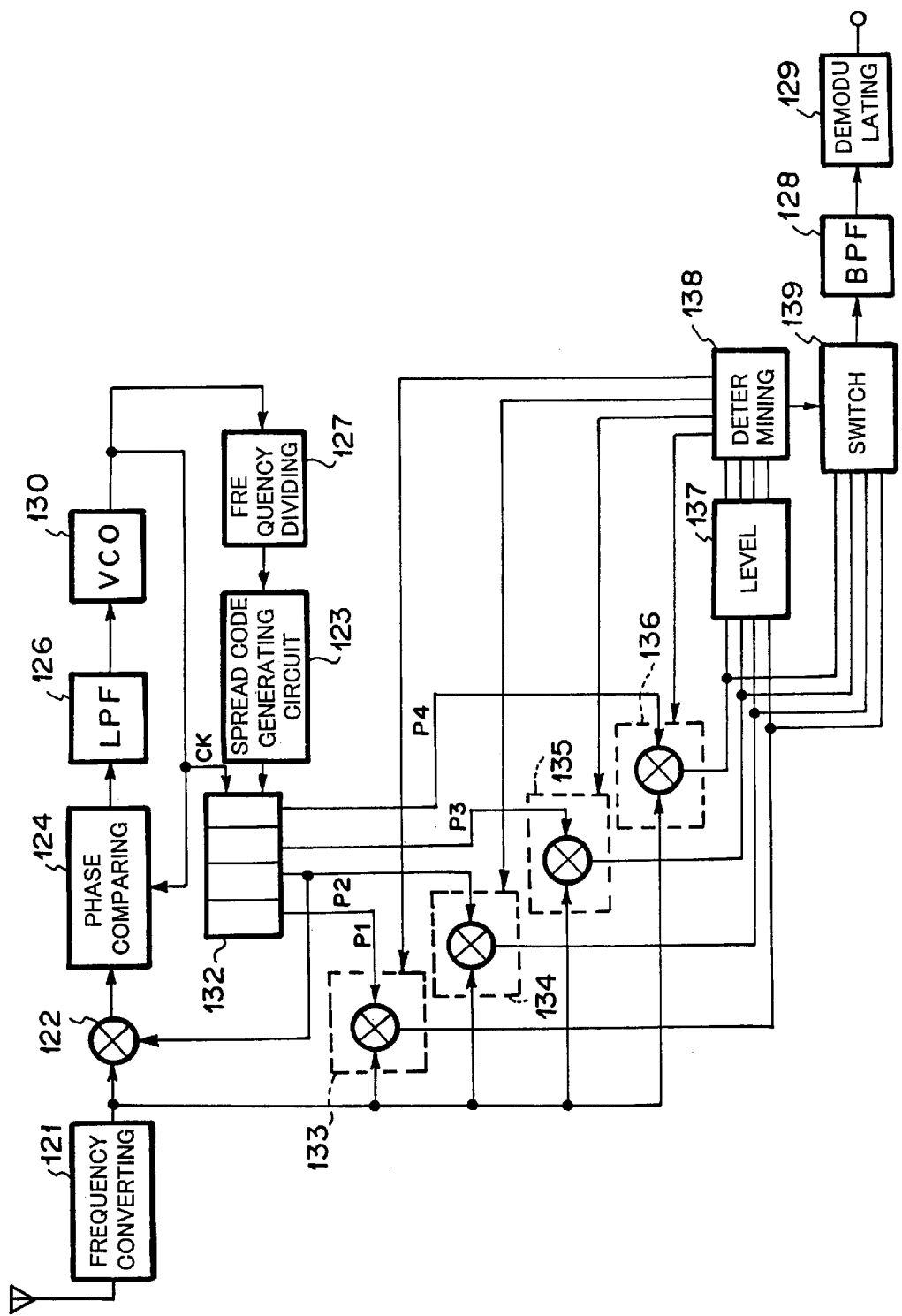
FIG. 1 is a block diagram showing the structure of a reception signal processing portion according to a first related art reference.
Figure 2:
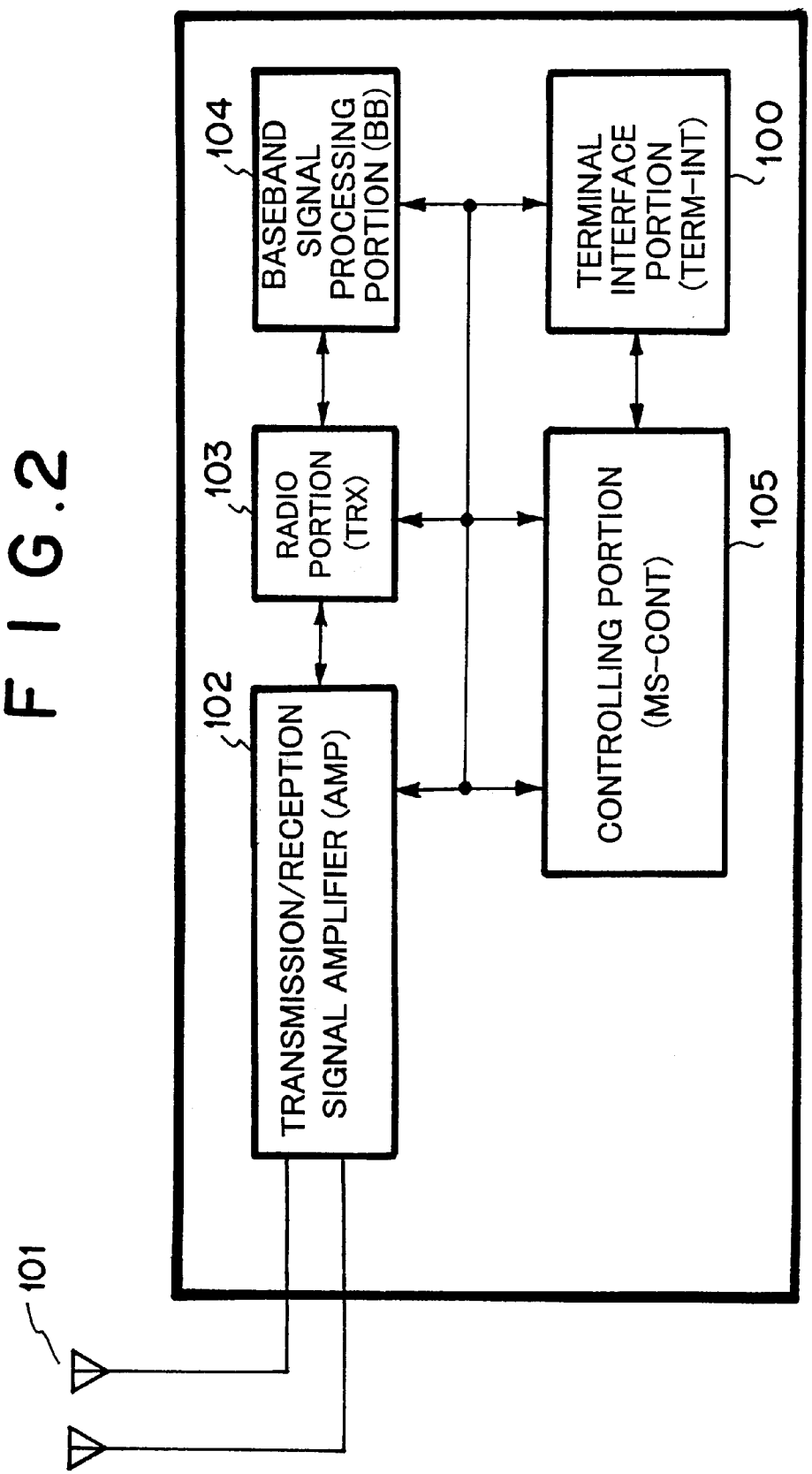
FIG. 2 is a block diagram showing the structure of a cellar system according to an embodiment of the present invention.

FIG. 2 is a block diagram showing the structure of a mobile apparatus of a digital mobile telephone/portable telephone system (cellular system) using the CDMA system according to an embodiment of the present invention.

In a cellular transmitting/receiving apparatus according to the embodiment of the present invention, an antenna 101 transmits an upbound RF signal amplified by a transmitting amplifier. In addition, the antenna 101 receives a downbound RF signal with a broad band that is spread-transmitted from a base station and supplies the reception signal to a transmitting/receiving amplifying portion (AMP) 102. The AMP 102 has a transmitting amplifier and a low noise amplifier. The transmitting amplifier amplifies the power of the transmission RF signal. The low noise amplifier amplifies the reception RF signal. The AMP 102 demultiplexes the RF transmission signal and the RF reception signal. A radio portion (TRX) 103 converts the baseband spread transmission signal as a digital signal into an analog signal. In addition, the TRX 103 modulates an input signal into an RF signal by orthogonal modulating method. Moreover, the TRX 103 sub-synchronously detects the signal received from the reception low noise amplifier, converts the resultant signal into a digital signal, and supplies the digital signal to a baseband signal processing portion (BB) 104.

The BB 104 performs an error correction encoding process, a frame segmenting process, a data modulating process, and a spread modulating process for the digital data received from the TRX portion 103. The BB 104 supplies the spread modulated signal to the TRX 103. In addition, the BB 104 performs baseband signal processes such as an inversely spreading process, a reception path timing searching process, a chip synchronizing process, an error correction decoding process, a data demultiplexing process, a diversity handover combining function, and a reception level measuring function for the reception signal. A controlling portion (MS-CONT) 105 controls the entire mobile apparatus such as setting a transmitting frequency and a receiving frequency of the TRX 103. A terminal interface portion (TERM-INT) 100 has an audio converter such as an ear phone and a speaker and an adapter function for various data such as a keyboard. In addition, the TERM-INT 100 has an interface function with a handset and a video/data terminal.

Figure 3:
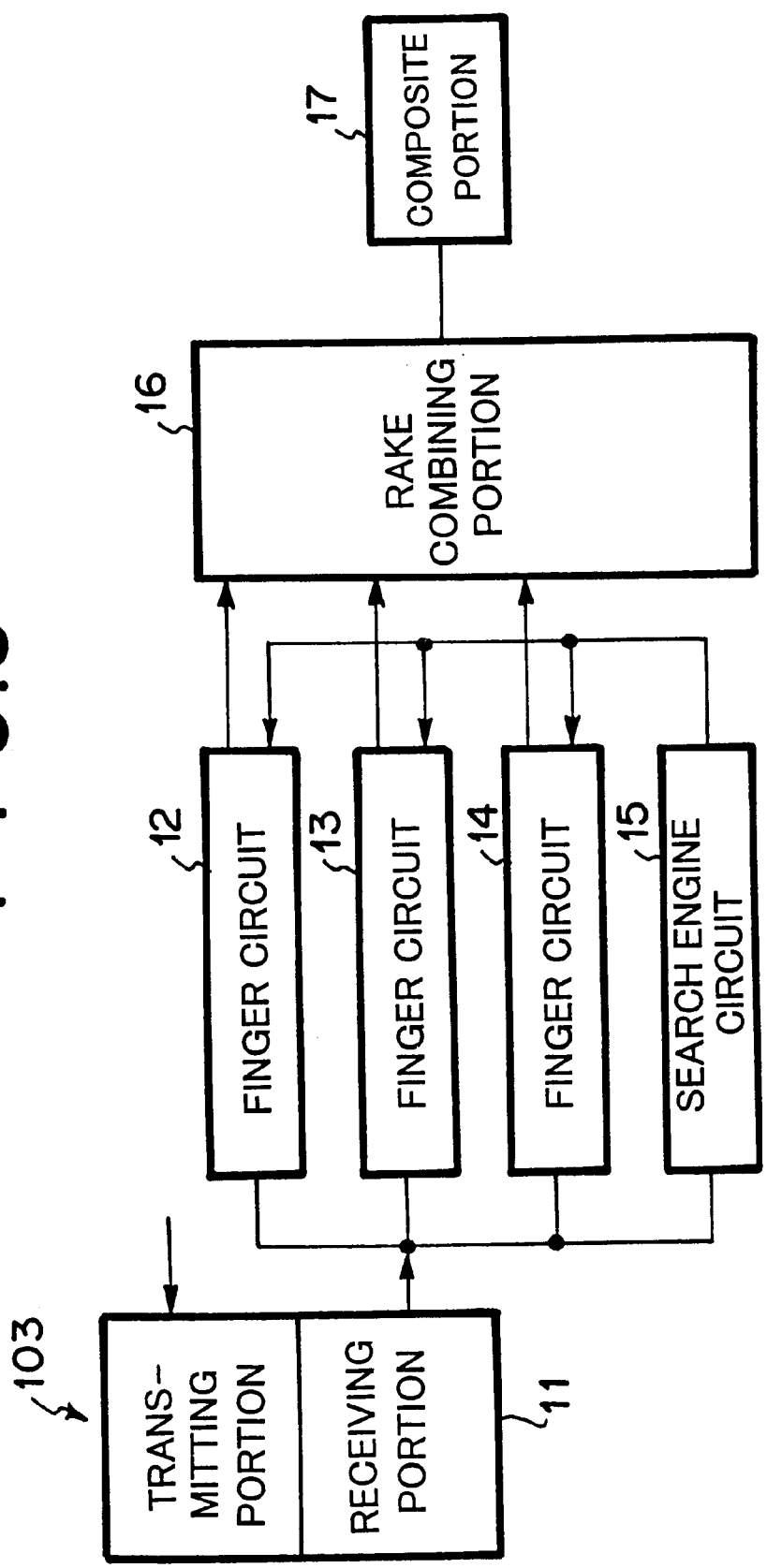
FIG. 3 is a block diagram showing the structure of a CDMA type RAKE receiver.

FIG. 3 is a block diagram showing the structure of a CDMA type RAKE receiver disposed in the BB 104.

In FIG. 3, a receiving portion 11 of the radio portion 103 demodulates a baseband signal. In FIG. 3, the receiving portion 11 receives a code spread RF signal, converts the reception signal into an intermediate frequency signal, and outputs a demodulated baseband signal. The baseband signal contains a plurality of spread signals due to multi-path fading. The spread baseband signal is supplied to finger circuits 12 to 14. The finger circuits 12 to 14 extract reception data from multi-path signals at predetermined timings and synchronously output the extracted data to a RAKE combining portion 16. The RAKE combining portion 16 combines the reception data extracted by the finger circuits 12 to 14.

The finger circuits 12 to 14 multiply respective spread codes with different phases by the input baseband signal corresponding to a spread code pattern assigned to the receiver so as to inversely spread the baseband'signal. The finger circuits 12 to 14 store inversely spread signals for a predetermined time period, square the amplitudes of the signals, and output the resultant signals.

A search engine circuit 15 has a plurality of (for example, 256) inversely spreading circuits. The search engine circuit 15 detects a correlation value of frame signals that have been inversely spread, detects a timing of a reception path with a high reception level, and outputs a phase signal corresponding to the reception path to the finger circuits 12 to 14.

Figure 4:
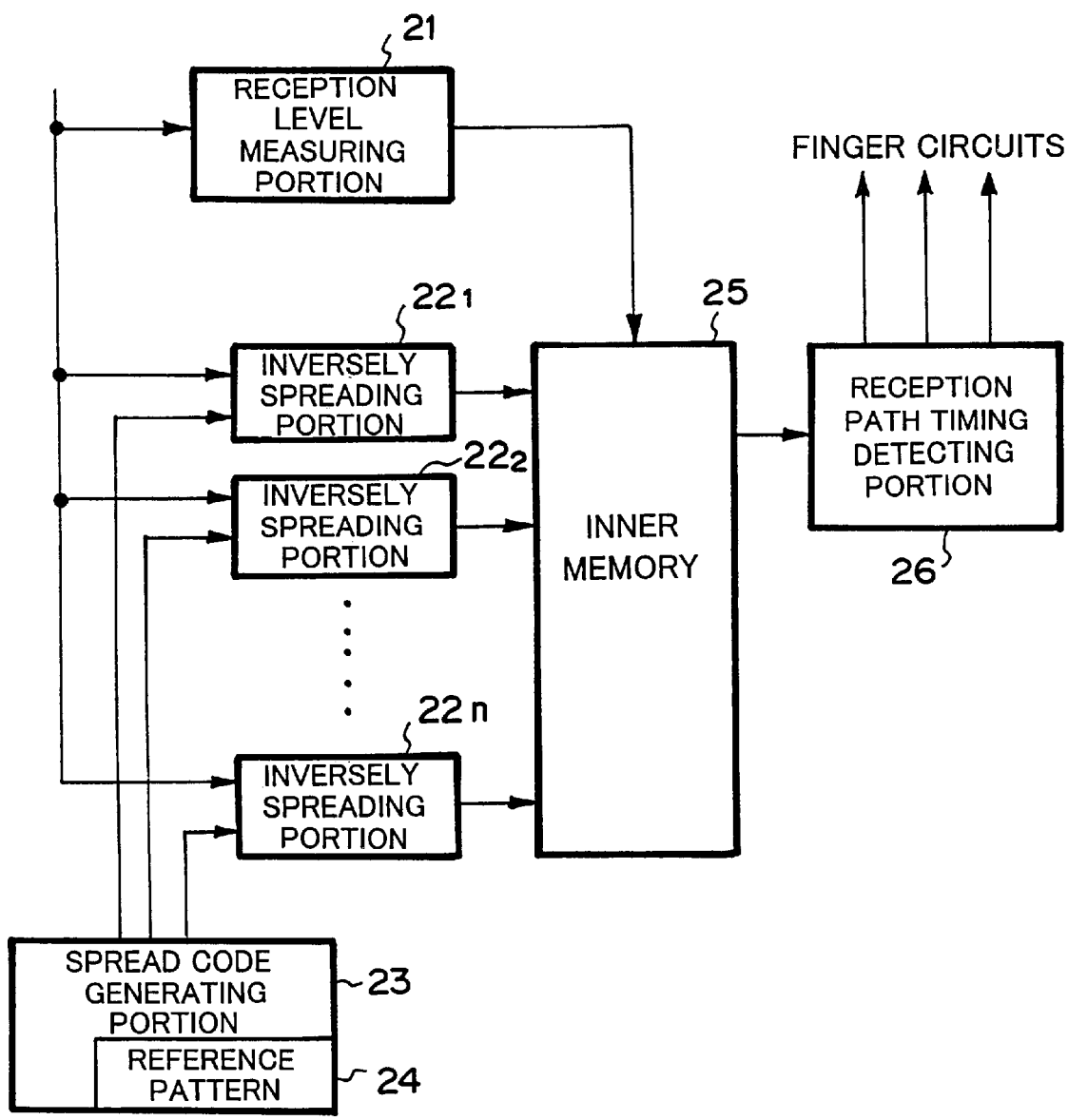
FIG. 4 is a block diagram showing a search engine portion of the CDMA type RAKE receiver.

FIG. 4 is a block diagram showing the search engine portion 15. A reception level measuring portion 21 detects the level of the reception signal corresponding to the baseband signal received from the receiving portion 11. Preferably, the reception level measuring portion 21 detects levels of reception signals for one frame as will be described later. The reception level measuring portion 21 compares the detected level with a predetermined threshold value and outputs a command signal to an inner memory 25 corresponding to the compared result as will be described later.

Figure 5:
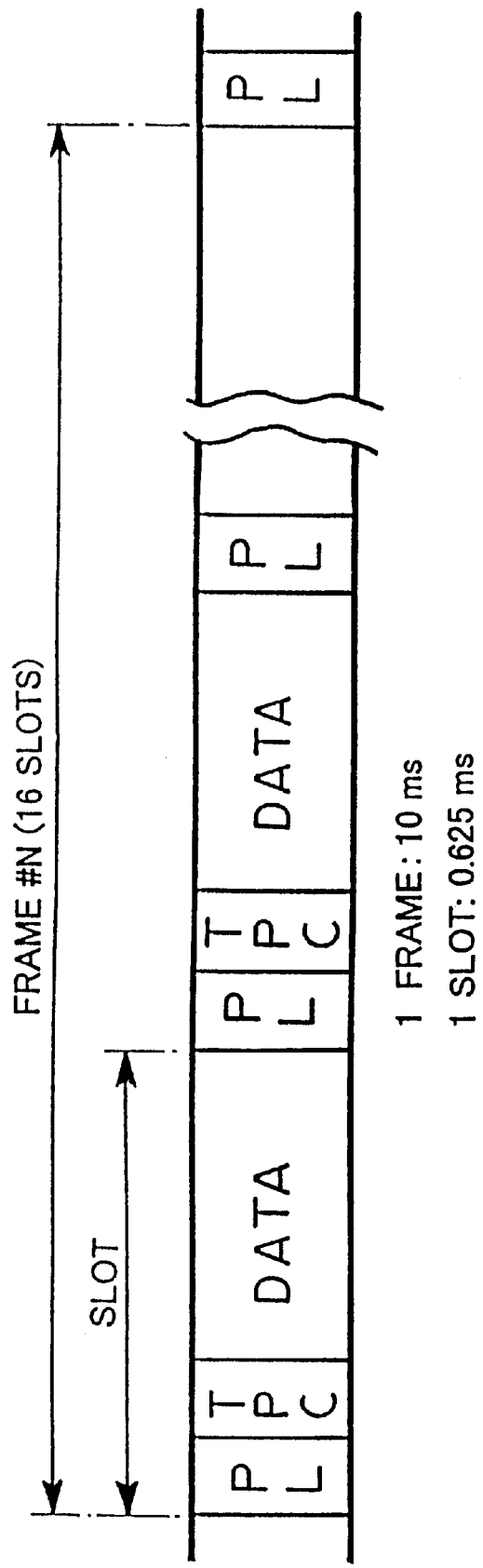
FIG. 5 illustrates the structure of a frame according to an embodiment of the present invention.

FIG. 5 shows the structure of a frame according to an embodiment of the present invention. A data signal is spread with a spread code composed of a plurality of chips per bit. 16 slots are assigned to one frame. Each slot is composed of a pilot signal PL, a transmission power symbol TPC, and data information DATA. In this embodiment, data signals are inversely spread for each frame. Thus, an optimum path timing corresponding to multi-paths is detected.

In FIG. 4, inversely spreading portions $22_1$ to $22_n$ n multiply the reception baseband signal by spread codes that delay by ¼ chip each so as to inversely spread the baseband signal. The inversely spreading portions $22_1$ to $22_n$ output the resultant data to the inner memory 25. A peak level is detected from the difference of the output signals of the inversely spreading portions $22_1$ to $22_n$. An output signal of one of the inversely spreading portions $22_1$ to $22_n$ is output from the inner memory 25. A reception path timing detecting portion 26 detects a path corresponding to the output signal of the inner memory 25 and outputs a timing signal corresponding to the path to the finger circuits 12 to 14.

The inner memory 25 stores output signals of the inversely spreading portions $22_1$ to $22_n$ for the current frame #n. In addition, the inner memory 25 stores output signals of the inversely spreading portions $22_1$ to $22_n$ for at least the just preceding frame #n−1. The reception level measuring portion 21 selects data of the current frame or data of the just preceding frame stored in the inner memory 25 corresponding to the reception level of each frame. In other words, when the reception level is larger than a predetermined threshold value, since the reliability of the correlation value with the peak value is high, the correlation value of the frame is output. On the other hand, when the reception level is lower than the predetermined threshold value, since the reliability of the correlation value with the peak value is low, the correlation value of the just preceding frame is output. The reception path timing detecting portion 26 supplies phase signals to the finger circuits corresponding to the phase of a path with a peak level corresponding to the phase value received from the inner memory 25.

Figure 6:
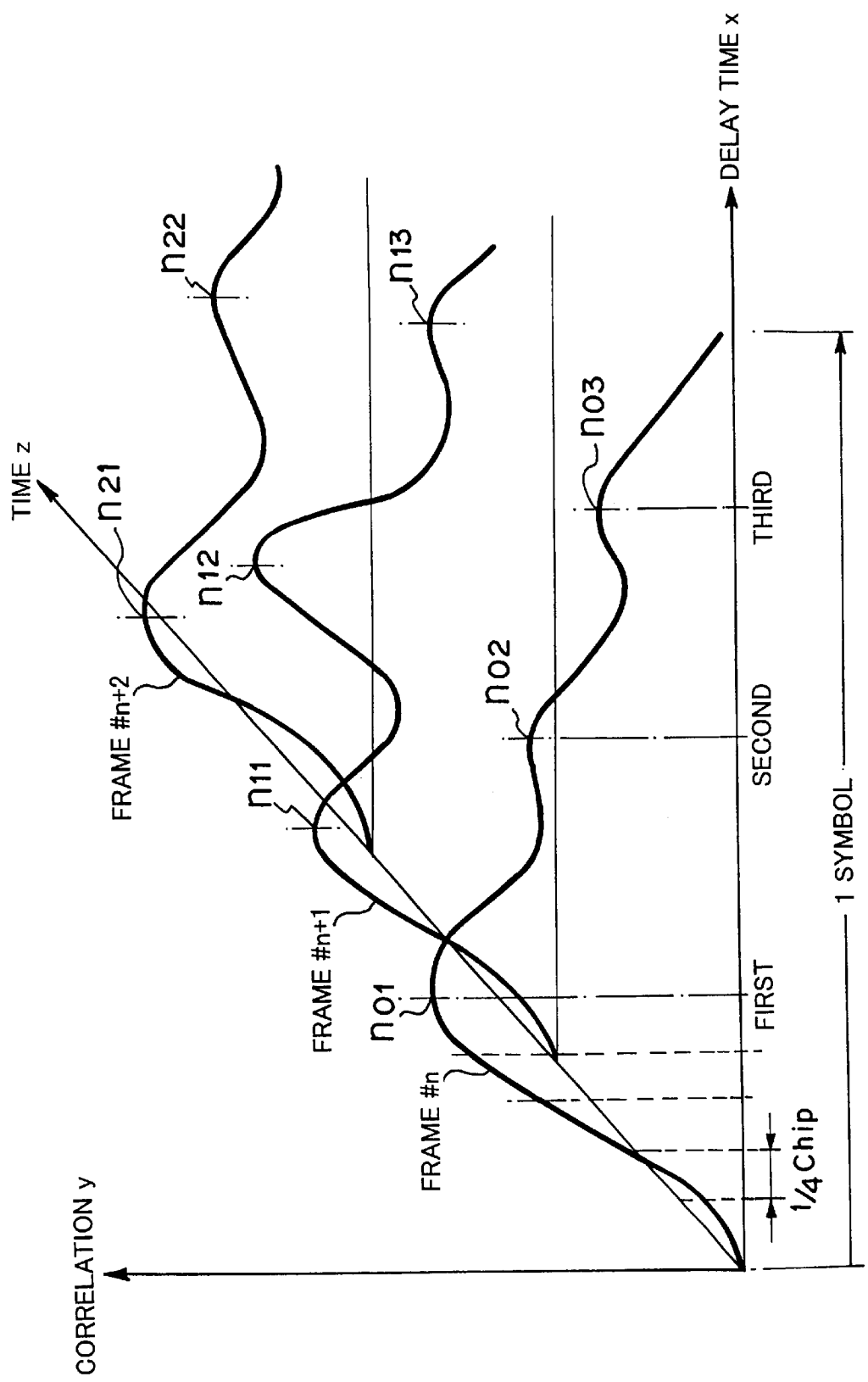
FIG. 6 is a graph showing exemplary output signals of a plurality of inversely spreading portions.

FIG. 6 is a graph showing examples of output signals of the inversely spreading portions $22_1$ to $22_n$. In FIG. 6, the x axis (horizontal axis) represents a delay time period of a spread code. The y axis (vertical axis) represents a correlation. The z axis represents an elapsed time period. The x-y coordinates of the frame #n represent output levels of, for example, 256 inversely spreading circuits to which spread codes with delay periods of ¼ chip each are supplied. Correlation values at individual delay points for individual frames are calculated. Since spread codes with slight delays are supplied, the highest correlation value is obtained in the first peak level. Due to Rayleigh fading multi-paths, waveforms with the second and third peaks are obtained. In FIG. 6, the first peak is the highest in the three peaks. The second peak is the second highest in the three peaks. The third peak is the lowest in the three peaks. On the other hand, the delay time periods of the peak values in the frame #n+1 are different from those in the frame #n. In addition, the second peak is the highest in the three peaks. The first peak is the second highest in the three peaks. The correlation waveform of the frame #n+2 is similar to the correlation waveform of the frame #n.

In addition to the case that a path fluctuates, such a situation takes place in the case that a reception signal fluctuates and deteriorates in a multi-path fading environment. In the embodiment, corresponding to the level of a reception signal, a path is assumed with correlation data with high reliability. In other words, when the level of the reception signal is lower than a predetermined threshold value, the correlation data of the reception signal is not used. Instead, correlation data of a reception signal with a higher level than the predetermined threshold value is used. In FIG. 6, since the levels of reception signals in the frames #n and #n+2 are high and the level of a reception signal in the frame #n+1 is low, correlation data in the frame #n+1 is not used to assume a path. Instead, corresponding to correlation data in the preceding frame #n, the finger circuits are controlled. The level of a reception signal can be expressed by the storage amount of the reception level in the pilot symbol period. In the RSSI method, another index may be used.

When the correlation waveform shown in FIG. 5 is obtained, if the reception level in the frame #n received by the reception level measuring portion 21 shown in FIG. 4 is higher than the predetermined threshold value, a signal of an inversely spreading portion 22 that outputs a reception signal with a peak in the frame #n is selected from the inner memory 25. A timing signal corresponding to the path with a peak is output to the finger circuits 12 to 14. On the other hand, when the reception level of the frame #n+1 is lower than the predetermined threshold value, the inversely spread value of the inversely spreading portion 22 is not supplied to the reception path timing detecting portion 26. The reception path timing detecting portion 26 reads a peak of multi-path components of signals in the preceding measuring period from the inner memory 25 and supplies a timing signal corresponding to the selected path to the finger circuits 12 to 14.

Thereafter, the finger circuits 12 to 14 inputs timing signals corresponding to the multi-paths. Correlators of the finger circuits 12 to 14 output correlation data. Thus, according to the embodiment, since reception paths of the finger circuits 12 to 14 are clearly defined, the structure becomes simple without need to use a narrow time window. Time information of the finger circuits 12 to 14 is output to the RAKE combining portion 16. The RAKE combining portion 16 synchronously adds output data of the finger circuits 12 to 14.

The reception level measuring portion 21 measures a reception level with a stored value for each chip in one frame. Alternatively, the reception level may be measured by Eb/N0 that is the ratio of reception power Eb/Hz and noise power N0/Hz.

Second Embodiment

Next, with reference to the accompanying drawings, a second embodiment of the present invention will be described. For simplicity, in FIG. 7, similar portions to those in FIG. 4 are denoted by similar reference numerals. The structure of a reception level measuring portion 21 shown in FIG. 7 may be the same as the structure of the reception level measuring portion 21 shown in FIG. 4. However, in the second embodiment, the reception level measuring portion 21 separates a baseband signal into I and Q signals, squares each of the I and Q signals, adds the results, detects a reception power level, compares the reception power level with a predetermined threshold value, and determines whether to select the current frame or the just preceding frame corresponding to the compared result.

A spread code generator 31 of a CPU 27 generates spread codes with phase delays of ¼ chip each and supplies the spread codes to individual inversely spreading portions 22. The inversely spreading portions 22 multiply the baseband signal by the spread codes and store the inversely spread results to latch portions 28 of the CPU 29. At that point, analog signals may be converted into digital signals. In addition, correlation signals that are output from the inversely spreading portions 22 are supplied to two latch portions. In other words, the two latch portions 28 alternately latch the correlation signals frame by frame. When the reception power level is lower than a predetermined threshold value, the correlation signal may be prohibited from being stored to the latch portions 28. When the reception power level is higher than the predetermined threshold value, a selecting switch 29 outputs a correlation signal corresponding to the relevant frame.

A pulse selection timing generating portion 30 selects a path corresponding to each peak portion of each frame shown in FIG. 6 corresponding to each correlation signal, generates a timing corresponding to the path, and outputs the timing to the finger circuits 12 to 14.

In the embodiment, two frames are considered for correlation signals. Even if three or more frames are considered, when output signals corresponding to the respective optimum frames are selected, a proper path with a high reception level can be selected. Moreover, in the embodiment, three finger circuits are disposed for three reception paths. Alternatively, when more finger circuits are disposed, the apparatus can handle fading of many paths that takes place in a downtown area.

In addition, since processes of the apparatus are controlled by the CPU 27, the structure of the apparatus becomes simple. The reception path timing detecting portion can be disposed in the CPU 27. Thus, the reliability of the apparatus can be improved.

The present invention is not limited to the above-described embodiments. In other words, the present invention can be applied to a base station apparatus of a CDMA cellar system. In other words, the present invention can be applied to a mobile portable apparatus and a base station thereof using a W-CDMA system or a TD-CDMA system of which a plurality of synchronizing circuits are required corresponding to a plurality of portable telephone apparatuses.

According to the present invention, a reception path timing is searched with reception data in a large reception level. Reception data is correlated and combined corresponding to the reception paths. Thus, an incorrect detection of a reception path due to the fluctuation of a reception level can be suppressed. Consequently, in a multi-path fading environment, a reception signal can be stably and accurately obtained.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A cellular system using code divisional multiple access (CDMA) system, comprising:
   a plurality of finger circuits; and
   a search engine portion comprising:
      a plurality of inversely spreading portions for multiplying reception signals by spread codes,
      an inner memory for storing correlation signals received from said plurality of inversely spreading portions,
      a reception level measuring portion for detecting reception levels from the reception signals, comparing the reception levels with a predetermined threshold value and outputting a compared result to said inner memory, and
      a reception path timing generating portion for detecting reception paths from output signals of said inner memory and generating a path timing,
      wherein said search engine portion determines whether or not to output a correlation signal of said inner memory to said reception path timing generating portion according to the compared result of said reception level measuring portion.

2. The cellar system as set forth in claim 1,
   wherein the reception levels of the reception signals are measured for each frame of the reception signals, and
   wherein when the reception levels of the reception signals in the current frame are lower than the predetermined threshold value, a correlation signal in the preceding frame is output from said inner memory.

3. The cellar system as set forth in claim 1,
   wherein said plurality of finger circuits inversely spread the reception signals corresponding to the reception paths detected by said search engine portion and synchronously adds correlation output signals of said plurality of finger circuits.

4. The cellar system as set forth in claim 2,
   wherein said plurality of finger circuits inversely spread the reception signals corresponding to the reception paths detected by said search engine portion and synchronously adds correlation output signals of said plurality of finger circuits.

5. A mobile portable apparatus using code divisional multiple access (CDMA) system, comprising:
   a demodulating portion for demodulating reception signals to baseband signals; and a search engine portion for selecting reception paths corresponding to multi-paths, said search engine portion comprising:
- a plurality of inversely spreading portions for multiplying reception signals by spread codes,
- an inner memory for storing correlation signals received from said plurality of inversely spreading portions,
- a reception level measuring portion for detecting reception levels from the reception signals, comparing the reception levels with a predetermined threshold value and outputting a compared result to said inner memory, and
- a reception path timing generating portion for detecting reception paths from output signals of said inner memory and generating a path timing,
- wherein said search engine portion determines whether or not to output a correlation signal of said inner memory to said reception path timing generating portion according to the compared result of said reception level measuring portion.

6. The mobile portable apparatus as set forth in claim 5,
wherein the reception levels of the reception signals are measured for each frame,
wherein when the reception levels of the reception signals in the current frame are lower than the predetermined threshold value, a correlation signal in the preceding frame is output from said inner memory, and
wherein said reception path timing generating portion selects a reception path from the preceding frame.

7. The mobile portable apparatus as set forth in claim 5, further comprising:
a plurality of finger circuits inversely spread the reception signals corresponding to the reception paths detected by said search engine portion and synchronously adds correlation output signals of said plurality of finger circuits.

8. The mobile portable apparatus as set forth in claim 6, further comprising:
a plurality of finger circuits inversely spread the reception signals corresponding to the reception paths detected by said search engine portion and synchronously adds correlation output signals of said plurality of finger circuits.

9. A base station apparatus of a cellular system using code divisional multiple access (CDMA) system, comprising:
an antenna for transmitting and receiving a signal to/from a mobile portable apparatus;
a radio portion for transmitting and receiving a signal to/from said antenna; and
a baseband portion for transmitting and receiving a signal to/from said radio portion,
wherein said baseband portion comprises:
- a spreading portion for spreading a transmission digital signal,
- a RAKE receiving portion for receiving signals corresponding to multi-paths, and
- a search engine portion for detecting reception paths, wherein said search engine portion comprises:
  - a plurality of inversely spreading portions for multiplying reception signals by spread codes,
  - an inner memory for storing correlation signals received from said plurality of inversely spreading portions,
  - a reception level measuring portion for detecting reception levels from the reception signals, comparing the reception levels with a predetermined threshold value and outputting a compared result to said inner memory, and
  - a reception path timing generating portion for detecting reception paths from output signals of said inner memory and generating a path timing,
  - wherein said search engine portion determines whether or not to output a correlation signal of said inner memory to said reception path timing generating portion according to the compared result of said reception level measuring portion.

10. The base station apparatus as set forth in claim 9,
wherein the reception levels of the reception signals are measured for each frame,
wherein when the reception levels of the reception signals in the current frame are lower than the predetermined threshold value, a correlation signal in the preceding frame is output from said inner memory, and
wherein said reception path timing generating portion selects a reception path from the preceding frame.

11. The base station apparatus as set forth in claim 9, further comprising:
a plurality of finger circuits inversely spread the reception signals corresponding to the reception paths detected by said search engine portion and synchronously adds correlation output signals of said plurality of finger circuits.

12. An optimum path detecting method used for code divisional multiple access (CDMA) system for demodulating reception signals to baseband signals and causing a search engine portion to select reception paths corresponding to multi-paths from the baseband signals, comprising:
detecting reception levels of the baseband signals;
comparing the reception levels with a predetermined threshold value and outputting the compared results to an inner memory;
multiplying the baseband signals by a spread code so as to inversely spread the reception signals;
storing correlation signals corresponding to the inversely spread results to the inner memory;
detecting a reception path from an output signal of the inner memory;
generating a path timing corresponding to the reception path; and
selectively outputting the correlation signal from the inner memory corresponding to the compared results.

13. The optimum path detecting method as set forth in claim 12,
wherein the reception levels of the reception signals are measured for each frame, and
wherein when the reception levels of the reception signals in the current frame are lower than the predetermined threshold value, a correlation signal in the preceding frame is output from the inner memory and a reception path is elected from the preceding frame.

14. The optimum path detecting method as set forth in cm 12, further comprising the steps of:
inversely spreading the reception signals corresponding to the reception paths detected by the search engine portion; and synchronously adding the correlation output signals.

* * * * *